United States Patent
Sawada et al.

(10) Patent No.: US 10,106,157 B2
(45) Date of Patent: Oct. 23, 2018

(54) VEHICLE CONTROL APPARATUS AND VEHICLE CONTROL METHOD

(71) Applicants: DENSO CORPORATION, Kariya-city, Aichi-pref. (JP); TOYOTA JIDOSHA KABUSHIKI KAISHA, Toyota-shi, Aichi-ken (JP)

(72) Inventors: Mototsugu Sawada, Kariya (JP); Motonari Ohbayashi, Nagakute (JP); Akihiro Kida, Toyota (JP); Hironobu Ishijima, Toyota (JP)

(73) Assignees: DENSO CORPORATION, Kariya, Aichi-pref. (JP); TOYOTA JIDOSHA KABUSHIKI KAISHA, Toyota-shi, Aichi-kn (JP)

( * ) Notice: Subject to any disclaimer, the term of this patent is extended or adjusted under 35 U.S.C. 154(b) by 0 days.

(21) Appl. No.: 15/539,068

(22) PCT Filed: Dec. 18, 2015

(86) PCT No.: PCT/JP2015/085492
§ 371 (c)(1),
(2) Date: Jun. 22, 2017

(87) PCT Pub. No.: WO2016/104364
PCT Pub. Date: Jun. 30, 2016

(65) Prior Publication Data
US 2017/0349170 A1    Dec. 7, 2017

(30) Foreign Application Priority Data
Dec. 24, 2014  (JP) ................... 2014-259883

(51) Int. Cl.
*B60W 30/09* (2012.01)
*B60W 30/18* (2012.01)

(52) U.S. Cl.
CPC ...... *B60W 30/09* (2013.01); *B60W 30/18009* (2013.01); *B60W 2520/28* (2013.01); *B60W 2550/10* (2013.01)

(58) Field of Classification Search
CPC .......... B60W 30/09; B60W 30/18009; B60W 2520/28; B60W 2550/10
(Continued)

(56) References Cited

U.S. PATENT DOCUMENTS

| 2013/0231825 | A1  | 9/2013 | Chundrlik, Jr. et al. |
| 2014/0025267 | A1* | 1/2014 | Tezuka ............... G08G 1/16 701/51 |

(Continued)

FOREIGN PATENT DOCUMENTS

| JP | 2014-091351   | 5/2014 |
| JP | 2014-091351 A | 5/2014 |

*Primary Examiner* — Marthe Y Marc-Coleman
(74) *Attorney, Agent, or Firm* — Knobbe, Martens, Olson & Bear, LLP

(57) ABSTRACT

A vehicle control apparatus detects an object in a travel direction of a vehicle. The vehicle control apparatus restrains a drive force of the vehicle when an object is detected. The vehicle control apparatus acquires a jerk in a travel direction on the basis of a behavior of the vehicle. When an accelerator of the vehicle is actuated while the vehicle is in a state in which the drive force of the vehicle is restrained, and a speed of the vehicle is lower than a predetermined value. The vehicle control apparatus increases the drive force, and decreases a post-increase drive force on the basis of the acquired jerk.

6 Claims, 6 Drawing Sheets

(58) Field of Classification Search
USPC .................................. 701/301; 340/436, 435
See application file for complete search history.

(56) References Cited

U.S. PATENT DOCUMENTS

2014/0222286 A1    8/2014    Chundrlik, Jr. et al.
2015/0025747 A1    1/2015    Chundrlik, Jr. et al.

* cited by examiner

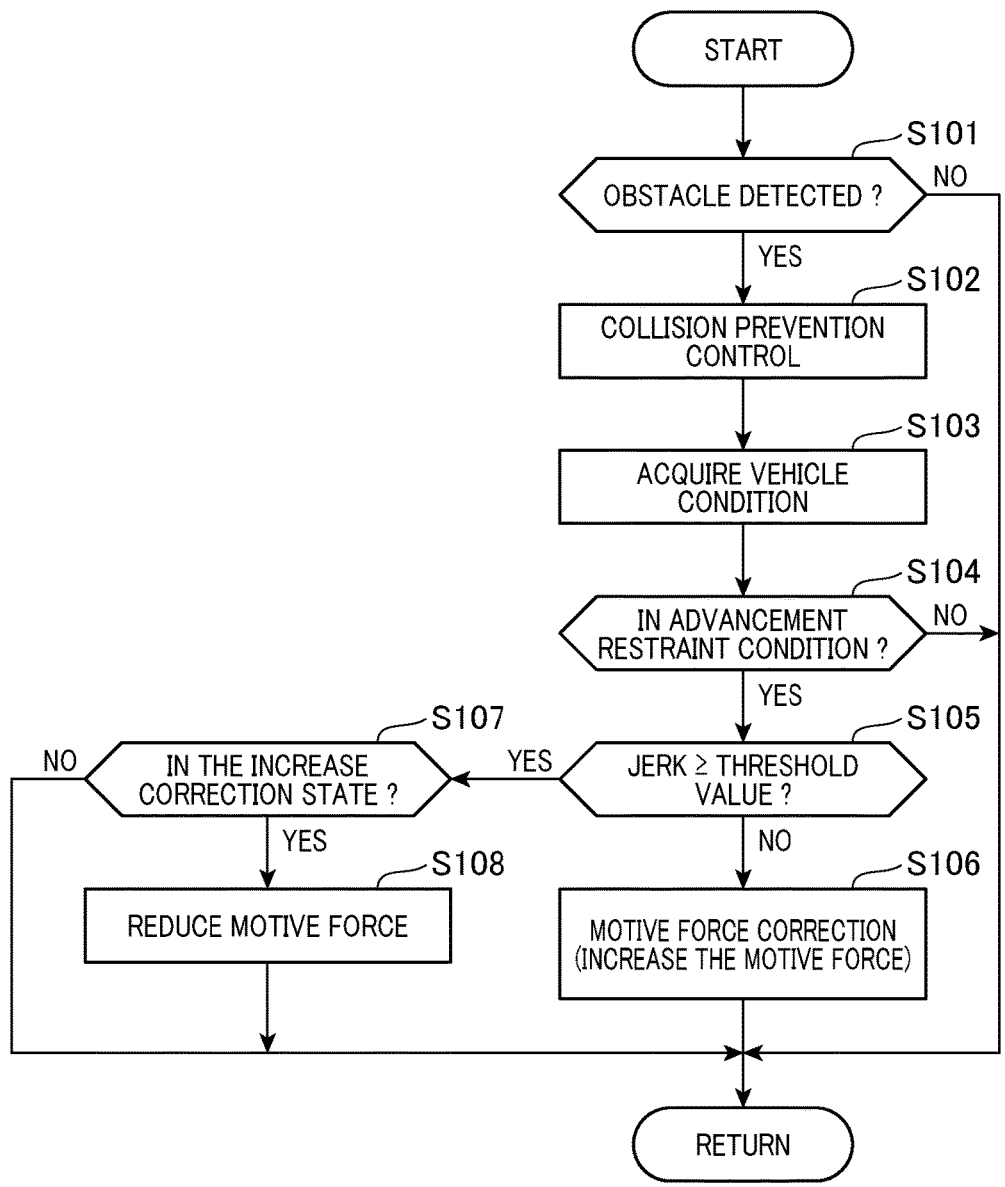

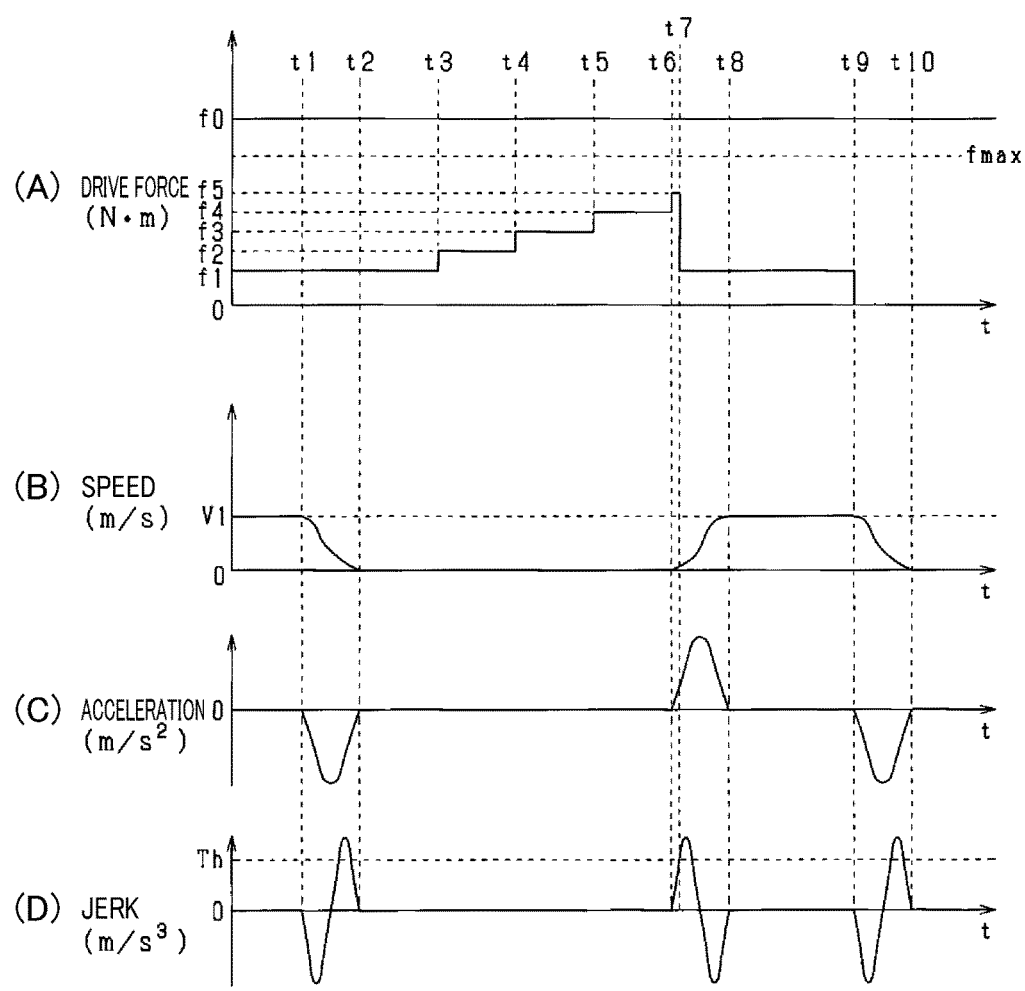

VEHICLE CONTROL APPARATUS AND VEHICLE CONTROL METHOD

CROSS-REFERENCE TO RELATED APPLICATION

This application is based on and claims the benefit of priority from earlier Japanese Patent Application No. 2014-259883 filed on Dec. 24, 2014 the descriptions of which is incorporated herein by reference.

TECHNICAL FIELD

The present disclosure relates to vehicle control technology for detecting objects that are in a travel direction of a vehicle and controlling the vehicle.

BACKGROUND ART

Vehicle control apparatuses proposed conventionally are used with a range-finding sensor, such as an ultrasonic sensor, being installed in vehicles. In such a vehicle control apparatus, objects, such as a preceding vehicle, a pedestrian, or an obstacle, in the environment of the vehicle are detected and the results of the detection are used as a basis for performing various types of control for improving the vehicle's running safety. The various types of control can include, for example, operating the brakes of the vehicle and providing notifications to the driver.

With such a vehicle control apparatus, when an obstacle has been detected in the travel direction of the vehicle, the vehicle is controlled to restrain (limit) the drive force in the travel direction. If at that time there is a step or the like between the vehicle and the obstacle, then even if there is a sufficient separation between the vehicle and the obstacle for the vehicle's possible approach to the obstacle, the drive force sufficient for the vehicle to cross over the step is not supplied. Accordingly, the vehicle cannot cross over the step and thus cannot sufficiently approach the obstacle.

PTL 1 describes a driving support apparatus as technology for enabling a vehicle to cross over a step present between the vehicle and an obstacle. With the driving support apparatus described in PTL 1, if there is an obstacle in the travel direction of the vehicle, the drive force of the vehicle is restrained. In addition, if there is a step between the vehicle and the obstacle, the driving support apparatus applies control for gradually increasing (boosting) the restrained drive force to cross over the step. The driving support apparatus then determines whether the vehicle has crossed over the step, using detected values derived from a wheel speed sensor. When it is determined that the vehicle has crossed over the step, the driving support apparatus restores the drive force to the restrained state from the increased state.

CITATION LIST

Patent Literature

[PTL 1] JP 2014-91351 A

SUMMARY OF THE INVENTION

Technical Problem

With a general type of wheel speed sensor, a rotor having concave and convex portions arrayed at regular intervals is attached to the axle of a vehicle wheel, and the vehicle speed is detected based on the period with which the concave and convex portions of the rotor alternate. Hence, when the vehicle speed is extremely low, the period with which the concave and convex portions alternate becomes longer, and the accuracy of detecting the vehicle speed decreases accordingly. Generally, when a vehicle crosses over a step, the vehicle speed is extremely low. With the driving support apparatus described in PTL 1, the drive force is ensured to be gradually increased to cross over the step, causing the vehicle speed to be even lower when the vehicle crosses over the step. For that reason, there is a concern that the driving support apparatus described in PTL 1 does not necessarily stably perform control of detecting the increase in the vehicle speed beyond a predetermined value, and of restoring the drive force to the restrained state from the increased state.

It is an object of the present disclosure to provide a vehicle control technology capable of reliably maintaining a vehicle in motion when the drive force is being restrained.

Solution to Problem

The present disclosure describes a vehicle control apparatus including an object detecting means, a restraining means, and a jerk acquiring means. The object detecting means detects an object in a travel direction of a vehicle. The restraining means restrains a drive force of the vehicle when the object detecting means detects the object. The jerk acquiring means acquires a jerk in a travel direction, on the basis of a behavior of the vehicle. In the apparatus, when the accelerator of the vehicle is actuated while the vehicle is in a state in which the drive force of the vehicle is restrained, and the speed of the vehicle is lower than a predetermined value, the restraining means increases the drive force and decreases the post-increase drive force on the basis of the jerk acquired by the jerk acquiring means.

When an object in the travel direction of the vehicle is detected, and the drive force of the vehicle is restrained according to the distance or the like to the object, the vehicle is unlikely to cross over a step present between the vehicle and the object, due to the drive force being restrained. Similarly, when the road surface is inclined, the vehicle is unlikely to be set in motion. When the speed of the vehicle in the travel direction is detected in this case, it is determined whether the vehicle is halted by the step or by the inclination of the road surface, on the basis of the detected speed. However, when the vehicle is instructed to move by the actuation of the accelerator or the like, there is a discrepancy between the command for the vehicle to move and the behavior of the vehicle. Hence, in such a case, the vehicle is required to be controlled such that the drive force of the vehicle is increased to move the vehicle as desired.

When the vehicle is set in motion by this control, the increased drive force is required to be decreased. However, in general, the means for detecting the speed of the vehicle, such as a wheel speed sensor, has low detection accuracy when the speed of the vehicle is extremely low. Hence, if the control for decreasing the increased drive force is performed based on the speed of the vehicle, the control may be delayed.

To address this concern, the vehicle control apparatus of the present disclosure causes a jerk detection means to detect start of movement of the vehicle, using a jerk that is a rate of change in acceleration per unit of time. Thus, the vehicle control apparatus of the present disclosure is not affected by an offset due to gravitational acceleration. Therefore, the vehicle control apparatus of the present disclosure can accurately detect start of movement of the vehicle.

BRIEF DESCRIPTION OF THE DRAWINGS

FIG. 3 is a flow diagram illustrating processing executed by the vehicle control apparatus according to an embodiment.

FIG. 4A is one of a set of timing diagrams illustrating the case in which the vehicle crosses over a step and approaches a wall.

FIG. 4B is one of a set of timing diagrams illustrating the case in which the vehicle crosses over a step and approaches a wall.

FIG. 4C is one of a set of timing diagrams illustrating the case in which the vehicle crosses over a step and approaches a wall.

FIG. 4D is one of a set of timing diagrams illustrating the case in which the vehicle crosses over a step and approaches a wall.

DESCRIPTION OF THE EMBODIMENTS

Figure 1:
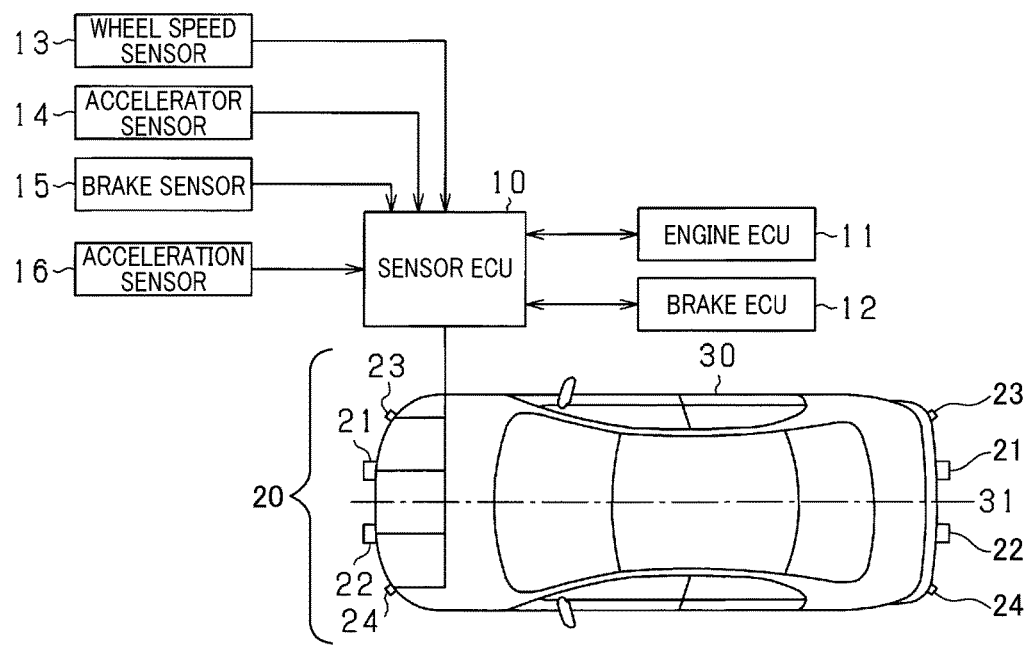
FIG. 1 is a schematic diagram illustrating a vehicle control apparatus.

A first embodiment of a vehicle control apparatus installed on a vehicle will be described in the following, referring to the drawings. The vehicle control apparatus according to the present embodiment receives detection information concerning objects from a range-finding sensor, and based on the received detection information, detects objects (e.g., other vehicles, or road structures) that are in the surroundings of the vehicle. Referring to FIG. 1, an outline of the vehicle control apparatus according to the present embodiment will be described.

In FIG. 1, a vehicle 30 includes, as a vehicle control apparatus, a sensor ECU 10, an engine ECU 11 and a brake ECU 12. The vehicle 30 further includes a wheel speed sensor 13, an accelerator sensor 14, a brake sensor 15, an acceleration sensor 16, and a range-finding sensor 20. The sensor ECU 10 receives the detection signals of the sensors 13 to 16 and 20 and executes braking control, such as inter-vehicle distance control, in cooperation with the engine ECU 11 and the brake ECU 12, based on the received detection signals. The sensors 13 to 16 and 20 are connected to the sensor ECU 10 for communication via an intra-vehicle network.

Each of the sensor ECU 10, the engine ECU 11, and the brake ECU 12 includes a microcomputer, and a wiring harness interface. The microcomputer includes a CPU, a ROM, a RAM, an I/O port, and a CAN communication apparatus.

The wheel speed sensor 13 is a pulse detection type of sensor which outputs a pulse signal having a predetermined period. The wheel speed sensor 13 of the present embodiment employs an electromagnetic pickup system, which outputs the pulse signal at the predetermined period according to passage of a plurality of protrusions provided on a rotor which rotates together with a vehicle wheel. The sensor ECU 10 receives the detection signal of the wheel speed sensor 13 and calculates the vehicle speed, based on the pulse period of the received detection signal.

The accelerator sensor 14 detects the degree of depression of the accelerator pedal. The sensor ECU 10 receives the detection signal of the accelerator sensor 14, calculates the required torque (the amount of air required for realizing the required torque), based on the received detection signal, and transmits the calculated required torque to the engine ECU 11. The brake sensor 15 detects the degree of depression of the brake pedal. The sensor ECU 10 receives the detection signal of the brake sensor 15, and transmits the received detection signal to the brake ECU 12.

The acceleration sensor 16 detects the acceleration of the vehicle 30 and is served by, for example, an electrostatic capacitance or piezo-resistive type of sensor. The acceleration sensor 16 detects acceleration with reference to a condition in which the vehicle 30 is halted on a flat road surface, with gravitational acceleration acting on the vehicle 30 in the vertical direction. That is, when the vehicle 30 is halted on an inclined road surface with the inclination direction being in the travel direction, the acceleration of the vehicle 30 is detected with respect to the travel direction corresponding to the inclination angle. The acceleration detected by the acceleration sensor 16 is inputted to the sensor ECU 10.

The range-finding sensor 20 transmits probe waves over a predetermined range, and detects objects by receiving the reflected waves and is served, for example, by an ultrasonic sensor. The range-finding sensor 20 transmits ultrasonic waves of 20 to 100 kHz as the probe waves and receives reflected waves from an object. With the present embodiment, the range-finding sensor 20 is attached to a front portion of the vehicle 30 (e.g., the front bumper). For example, with the vehicle 30 of the present embodiment, four range-finding sensors 21 to 24 are mounted side by side at predetermined spacings therebetween in a direction (vehicle width direction) perpendicular to the travel direction of the vehicle. Specifically, a first center sensor 21 and a second center sensor 22 (two center sensors) are attached near a center line 31 of the vehicle 30 so as to be located at positions that are symmetrical with respect to the center line 31. A first corner sensor 23 and a second corner sensor 24 are attached near the respective corners (left corner and right corner) of the front part of the vehicle 30. Another range-finding sensor 20 is also attached to a rear part (e.g., the rear bumper) of the vehicle 30 of the present embodiment. Since the range-finding sensor 20 in the rear part of the vehicle 30 has the same mounting positions and functions as those of the range-finding sensor 20 in the front part of the vehicle 30, description is omitted herein.

The sensor ECU 10 detects the presence of objects in the environment of the vehicle 30, based on detection information on such objects received from the range-finding sensor 20. Specifically, the sensor ECU 10 transmits a control signal to the range-finding sensor 20, instructing the range-finding sensor 20 to transmit probe waves at predetermined time intervals (e.g., at intervals of several hundred milliseconds). Accordingly, the range-finding sensor 20 transmits probe waves over a predetermined range, and transmits received signals of reflected waves to the sensor ECU 10 as detection information on objects. On receiving the detection information on objects from the range-finding sensor 20, the sensor ECU 10 determines the presence of objects in the environment of the vehicle 30, based on the received detection information. If it is determined as a result that there is an object in the environment of the vehicle 30, the sensor ECU 10 cooperates with the engine ECU 11 and the brake ECU 12 to execute braking control, e.g., deceleration, such as to prevent the vehicle 30 from contacting (colliding) with the object. Alternatively, the sensor ECU 10 may emit an alarm sound to provide a warning notification to the driver of the vehicle 30. The present embodiment assumes a situation in which the vehicle 30 is traveling at a low speed and an obstacle (e.g., another vehicle, wall, or pillar) is detected which is at a relatively close distance to the vehicle 30 (e.g., 5 m), when the vehicle avoids contact with the detected obstacle (hereinafter referred to as "collision avoidance"). Hence, the vehicle control apparatus of the present embodiment exerts its functions when the vehicle 30 is parked, for example.

Figure 2A:
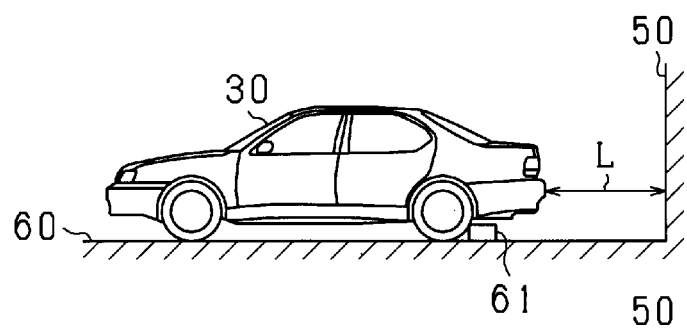
FIG. 2A is one of a set of diagrams illustrating a situation in which a vehicle crosses over a step and approaches a wall.
Figure 2B:
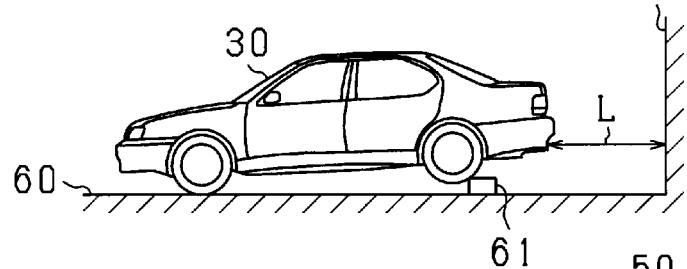
FIG. 2B is one of a set of diagrams illustrating a situation in which a vehicle crosses over a step and approaches a wall.
Figure 2C:
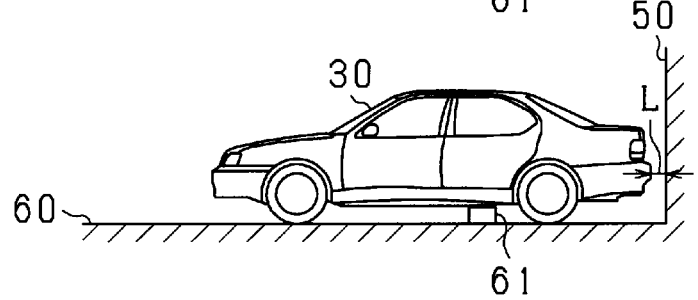
FIG. 2C is one of set of diagrams illustrating a situation in which a vehicle crosses over a step and approaches a wall.

FIGS. 2A to 2C show a situation in which the vehicle 30 is moved backward, crossing over a step 61 formed on the road surface 60, and parked with the rear part of the vehicle 30 close to a wall 50.

The range-finding sensor 20 detects a distance L between the vehicle 30 and the wall 50. The distance L becomes shorter as the vehicle 30 moves backward. When the distance L is below a distance that has been predetermined as a basis for determining commencement of restraint of the drive force (hereinafter the distance is referred to as driving restraint distance), control is applied for restraining the drive force of the vehicle 30. This creates a condition in which the vehicle 30 is not supplied with sufficient drive force to cross over the step 61. Accordingly, as shown in FIG. 2A, the vehicle 30 stops short of crossing over the step 61, against the driver's desire.

As shown in FIG. 2B, when the drive force is increased, the vehicle 30 can cross over the step 61 from the position in front of the step 61 and approach the wall 50. As shown in FIG. 2C, the distance L between the vehicle 30 and the wall 50 then is further shortened. Thus, when the distance L reaches a distance that has been predetermined as a basis for determining halting of the vehicle 30 for avoiding collision (this distance is hereinafter referred to as stopping distance), the drive force is restrained and braking control is applied to stop the vehicle 30 without touching the wall 50.

Since acceleration occurs when the vehicle 30 begins to move, the detected value (detected acceleration) from the acceleration sensor 16 could be used for determining whether the vehicle 30 has started to move. However, when the vehicle 30 is in an inclined attitude, such as when the road surface 60 is inclined, the detected acceleration has a value that is incremented by an amount based on gravitational acceleration. Hence, when the vehicle 30 is in an inclined attitude, the acceleration in the travel direction of the vehicle 30 cannot be accurately detected.

With the vehicle control apparatus of the present embodiment therefore, the detected values from the acceleration sensor 16 are each differentiated with respect to time, to calculate a jerk, which is the rate of change in acceleration per unit of time, and a decision is made using the calculated jerk as to whether movement of the vehicle 30 has started. That is to say, when the vehicle 30 is halted on an inclined road surface 60, acceleration based on gravitational acceleration is detected; however, since that value of detected acceleration is constant, jerk is not detected. On the other hand, when the vehicle 30 begins to move from the halted condition, since there is a change in acceleration in the travel direction detected based on the behavior of the vehicle 30, jerk is detected. With the present embodiment, the sensor ECU 10 acquires detected values from the acceleration sensor 16 at predetermined time intervals, and divides the amount of change in each detected acceleration by a predetermined time value, to calculate the rate of change in acceleration per unit of time, thereby obtaining the value of jerk. Thus, the sensor ECU 10 serves as an acceleration acquiring means acquiring acceleration of the vehicle 30 in the travel direction, and as a jerk acquiring means acquiring jerk in the travel direction.

FIG. 3 is a flow diagram illustrating a processing sequence executed by the vehicle control apparatus of the present embodiment. The processing shown in FIG. 3 is cyclically executed by the sensor ECU 10 provided to the vehicle control apparatus of the present embodiment. It should be noted that by executing the control shown in FIG. 3, the sensor ECU 10 serves as a restraining means restraining the drive force of the vehicle 30 when an object is detected.

Firstly, the sensor ECU 10 determines whether an obstacle has been detected within the driving restraint distance, in the travel direction of the vehicle 30 (S101). In this case, the sensor ECU 10 serves as an object detecting means detecting objects that are in the travel direction of the vehicle 30. If it is determined as a result that no obstacle has been detected (NO at S101), the sensor ECU 10 determines that there is no need to restrain the drive force of the vehicle 30, and transmits to the engine ECU 11 a torque request value that is calculated based on the detection signal from the accelerator sensor 14. Thus, a drive force (hereinafter referred to as requested drive force) f0 requested by the vehicle driver's accelerator operation is generated by the vehicle 30. The sensor ECU 10 terminates the processing sequence when this processing has been performed. Thus, when there is a step 61 in the travel direction, the vehicle 30 can cross over the step 61 as desired by the driver.

On the other hand, when it is determined that an obstacle has been detected (YES at S101), the sensor ECU 10 determines that it is necessary to restrain the drive force of the vehicle 30, and performs collision prevention control by restraining the drive force (S102). In this case, when commencing obstacle detection, the sensor ECU 10 sets the restrained drive force to f1, based on a value predetermined for restraining the drive force of the vehicle 30. The restrained drive force f1 corresponds, for example, to a drive force gradually reducing speed of the vehicle 30. Hence, by setting the restrained drive force of the vehicle 30 to f1, the sensor ECU 10 can restrain the vehicle 30 from rapidly approaching the obstacle. It should be noted that the sensor ECU 10 sets the restrained drive force to f1 when the drive force f0 conforming to the driver's accelerator operation is greater than f1.

Subsequently, the sensor ECU 10 acquires various signals indicating the condition of the vehicle 30 (S103), and determines whether the vehicle 30 is in a movement-restrained state (S104). In the determination processing of S104 of the present embodiment, the vehicle 30 is determined to be in the movement-restrained state if all the following conditions (a) to (d) are satisfied. In other words, with the present embodiment, if any one of the following conditions (a) to (d) is not satisfied, the vehicle 30 is determined not to be in the movement-restrained state.

(a) The driver's accelerator operation is not being detected by the accelerator sensor 14 while the vehicle 30 is halted.

(b) The drive force is being restrained by collision avoidance control.

(c) The brakes are not being actuated by collision avoidance control.

(d) The driver's brake operation is not being detected by the brake sensor 15.

If the condition (a) is not satisfied, the driver is not operating the accelerator then, although the vehicle 30 is halted, and so the driver does not desire to cross over the step 61. Hence, if the condition (a) is not satisfied, it is determined that there is no need to perform control for correcting the drive force of the vehicle 30 to enable the vehicle 30 to cross over the step 61. If the condition (b) is not satisfied, the requested drive force f0 that is requested by the driver's accelerator operation is insufficient, i.e., less than the drive force required to cross over the step 61. That is to say, the driver does not desire to cross over the step 61. If the drive force is corrected and increased then, the corrected drive force will exceed the requested drive force f0. Hence, if condition (b) is not satisfied, it is determined that control for correcting the drive force of the vehicle 30 is not required to be performed. If the condition (c) is not satisfied, the distance L between the vehicle 30 and the wall 50 is shorter than the stopping distance, so that the halted state of the vehicle 30 is required to be maintained. Hence, if the condition (c) is not satisfied, it is determined that control for correcting the drive force of the vehicle 30 is not required to be performed. If the condition (d) is not satisfied, this means that the driver desires to halt the vehicle 30. Hence, if the condition (d) is not satisfied, it is determined that control for correcting the drive force of the vehicle 30 is not required to be performed.

Therefore, if the above conditions are all satisfied, it is determined that the vehicle 30 is in a condition in which the drive force is being restrained by the collision prevention control and the vehicle 30 cannot cross over the step 61, against the driver's desire. Hence, if the above conditions are all satisfied, the sensor ECU 10 determines that the vehicle 30 is in the movement-restrained state (YES at S104). If not all of the above conditions are satisfied and thus the vehicle 30 is determined not to be in the movement-restrained state (NO at S104), the sensor ECU 10 directly terminates the processing sequence.

If it is determined that the vehicle is in the movement-restrained state, the sensor ECU 10 serves as a jerk acquiring means and determines whether the obtained (calculated) jerk is equal to or greater than a predetermined threshold Th (S105). In this case, if the vehicle 30 has not crossed over the step 61, there will be no change in the acceleration in the travel direction, and the jerk will not change. Thus, if the value of the jerk is lower than the threshold Th (NO at S105), the sensor ECU 10 determines that the vehicle 30 has not crossed over the step 61, against the driver's desire, and corrects the drive force (S106). Specifically, if the vehicle 30 is in the movement-restrained state and there is no change in the jerk in the travel direction, the sensor ECU 10 restores the state of the drive force to the non-restrained state from the restrained state, and performs correction for increasing the drive force. In the correction performed at S106 of the present embodiment, the value of the drive force in the preceding control cycle, which is stored in a predetermined storage area such as a memory, is acquired to add a predetermined value to the acquired drive force value. That is, at S106, the drive force of the vehicle 30 is corrected and increased by a fixed amount. Then, in the correction performed at S106, a control signal is generated to serve as a command for the increased drive force, based on the value of the drive force after the addition (after correction), and the generated control signal is transmitted to the engine ECU 11. The upper limit of increase of the drive force is set to fmax that is a maximum drive force. The value of the maximum drive force fmax is determined based on, for example, the distance L between the vehicle 30 and the wall 50 (object, such as an obstacle). In this case, if the requested drive force f0 is less than the maximum drive force fmax, the upper limit of the drive force is set to the required drive force f0. That is, in the correction performed at S106, the upper limit of the drive force is set to the maximum drive force fmax or the required drive force f0, whichever is smaller.

Let us assume that the drive force of the vehicle 30 has become sufficient for the vehicle to cross over the step 61 as a result of the correction performed at S106. In this case, acceleration in the travel direction of the vehicle 30 changes, jerk also changes, and the jerk indicates a positive value. In this case, the sensor ECU 10 performs peak-holding processing with respect to the value of the jerk until the subsequent control cycle (temporarily holds the value in the predetermined storage area). Thus, if the value of the jerk that has been subjected to the peak holding processing becomes equal to or greater than the threshold Th, the sensor ECU 10 determines that the vehicle 30 has started the movement of crossing over the step 61. That is, by determining whether the value of the jerk that has been subjected to the peak holding processing is equal to or greater than the threshold Th in the determination processing of S105 in the subsequent control cycle, the sensor ECU 10 determines whether the vehicle 30 has started the movement of crossing over the step 61.

If the value of the jerk is determined to be equal to or greater than the threshold Th (YES at S105), the sensor ECU 10 determines whether the drive force of the vehicle 30 is in the state of having been increased (referred to as increase-correction state in the following) by the correction performed at S106 of the preceding control cycle (S107). If the sensor ECU 10 determines as a result that the drive force of the vehicle 30 is in the increase-correction state (YES at S107), the sensor ECU 10 decreases the drive force that had been increased in the preceding control cycle (S108) and terminates the processing sequence. At S107 of the present embodiment, the value of the post-increase drive force in the preceding control cycle, which has been stored in the predetermined storage area of a memory, for example, is acquired and the increment is subtracted from the acquired post-increase drive force. That is, correction is applied at S107 for restoring the drive force of the vehicle 30 to the state prior to increase, from the increase-correction state. On the other hand, when the sensor ECU 10 determines that the drive force of the vehicle 30 is not in the increase-correction state (NO at S107), the sensor ECU 10 directly terminates the processing sequence, because the drive force of the vehicle 30 is not required to be changed. It should be noted that it would be equally possible to execute the processing of S108 if the value of the jerk is equal to or greater than the threshold Th and a predetermined time has elapsed. That is, when the vehicle 30 that has been halted before crossing over the step 61 starts to move, followed by change in the jerk of the vehicle 30 due to the vehicle's riding over the step 61, it is preferable to temporarily increase the restrained drive force f1 at least until completion of the vehicle's riding over the step 61.

After the drive force has been corrected at S106 of the preceding control cycle, if it is determined, at S104 in the subsequent control cycle, that the vehicle 30 is not in the movement-restrained state, then the processing sequence is terminated by the ECU 10 without correcting the drive force. Further, if the driver ceases to actuate the accelerator, or the wheel speed sensor 13 detects movement of the vehicle 30, then the processing sequence is terminated by the ECU 10 in the same way, without correcting the drive force.

FIGS. 4A to 4B are a set of timing diagrams of when the above processing is executed by the vehicle control apparatus of the present disclosure, for the case in which the vehicle 30 crosses over a step and approaches the wall 50. In the example shown in FIGS. 4A to 4B, it is assumed that within the time range of the timing diagrams, the degree of the driver's depression of the accelerator pedal is fixed, with the drive force based on the degree of depression of the accelerator pedal being the requested drive force f0. It is further assumed that the distance L between the vehicle 30 and the wall 50 is less than the driving restraint distance, and that the drive force is the restrained drive force f1 which is less than the requested drive force f0 based on the degree of depression of the accelerator pedal. The vehicle speed when traveling the flat road surface 60 with the restrained drive force f1 is V1.

Firstly, at time t1, the drive force of the vehicle 30 is the restrained drive force f1, which is not sufficient for the vehicle to cross over the step 61. Hence, when the vehicle wheels contact the step 61, the vehicle 30 decelerates from the speed V1. Accordingly, the vehicle 30 halts at time t2. With the vehicle control apparatus of the present disclosure, this state is continued during a predetermined period of time to correct the drive force. Accordingly, at time t3, after lapse of the predetermined period of time from time t2, the drive force is increased from the restrained drive force f1 to a corrected drive force f2 (drive force increases). In this case, if the corrected drive force f2 is insufficient for the vehicle to cross over the step 61, the vehicle 30 is not able to cross over the step 61, so that the vehicle speed, acceleration and jerk remain unchanged. With the vehicle control apparatus of the present disclosure, if this state continues for a predetermined interval, i.e. at time t4 after lapse of a predetermined time from time t3, the drive force is increased to f3, which is greater than f2. With the vehicle control apparatus of the present disclosure, if the vehicle 30 cannot cross over the step 61 even with the corrected drive force f3 and there is no change in the jerk, then at time t5, the drive force is increased to f4 which is greater than f3. Similarly, at time t6, the drive force is increased to f5 which is greater than f4.

Accordingly, with the vehicle control apparatus of the present disclosure, the drive force f5 becomes sufficient at time t6 as a drive force required for the vehicle 30 to cross over step 61. Hence, the vehicle 30 is set in motion. In this case, there is a change in acceleration in the travel direction detected by the acceleration sensor 16. Hence, there is also a change in the jerk which is calculated then. In addition, with the vehicle control apparatus of the present disclosure, when the jerk exceeds the threshold Th at time t7, it is determined that the vehicle 30 has crossed over the step 61 due to the increase in drive force. If the drive force is held in the increased state in this case, there is a risk that the speed at which the vehicle 30 approaches the wall 50 will become excessive. To address this concern, the vehicle control apparatus of the present disclosure reduces the drive force on condition that the jerk exceeds the threshold Th. For example, the drive force may be restored to the restrained drive force f1 from the value f5. In this case, when the vehicle 30 has already crossed over the step 61, although the drive force is the restrained drive force f1, the vehicle 30 accelerates based on the restrained drive force f1, and reaches, at time t8, the vehicle speed V1 corresponding to the restrained drive force f1. Thereafter, with the vehicle control apparatus of the present disclosure, when the distance L between the vehicle 30 and the wall 50 becomes shorter than the stopping distance at time t9, the drive force is reduced to zero by collision avoidance control, and braking control is commenced by applying the brakes. As a result of this braking control, the vehicle 30 decelerates and, at time t10, the vehicle speed becomes zero.

Figure 5A:
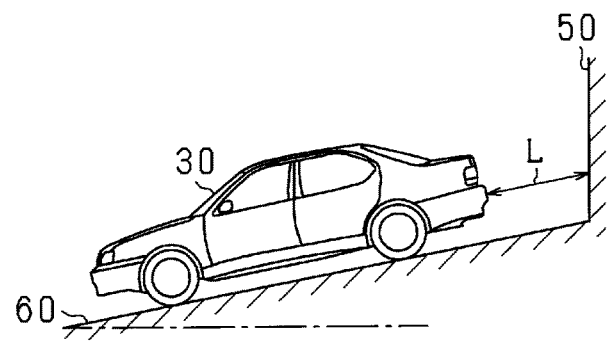
FIG. 5A is one of a set of diagrams illustrating a situation in which a vehicle on an inclined road surface approaches a wall.
Figure 5B:
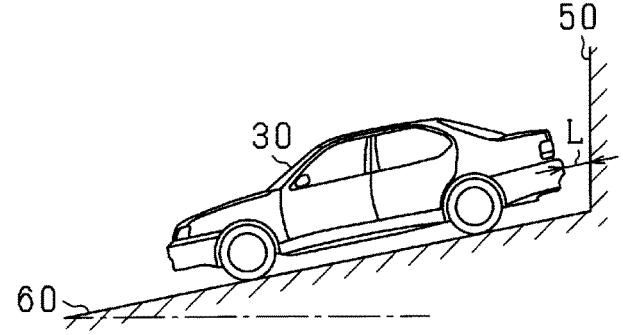
FIG. 5B is one of a set of diagrams illustrating a situation in which a vehicle on an inclined road surface approaches a wall.
Figure 6:
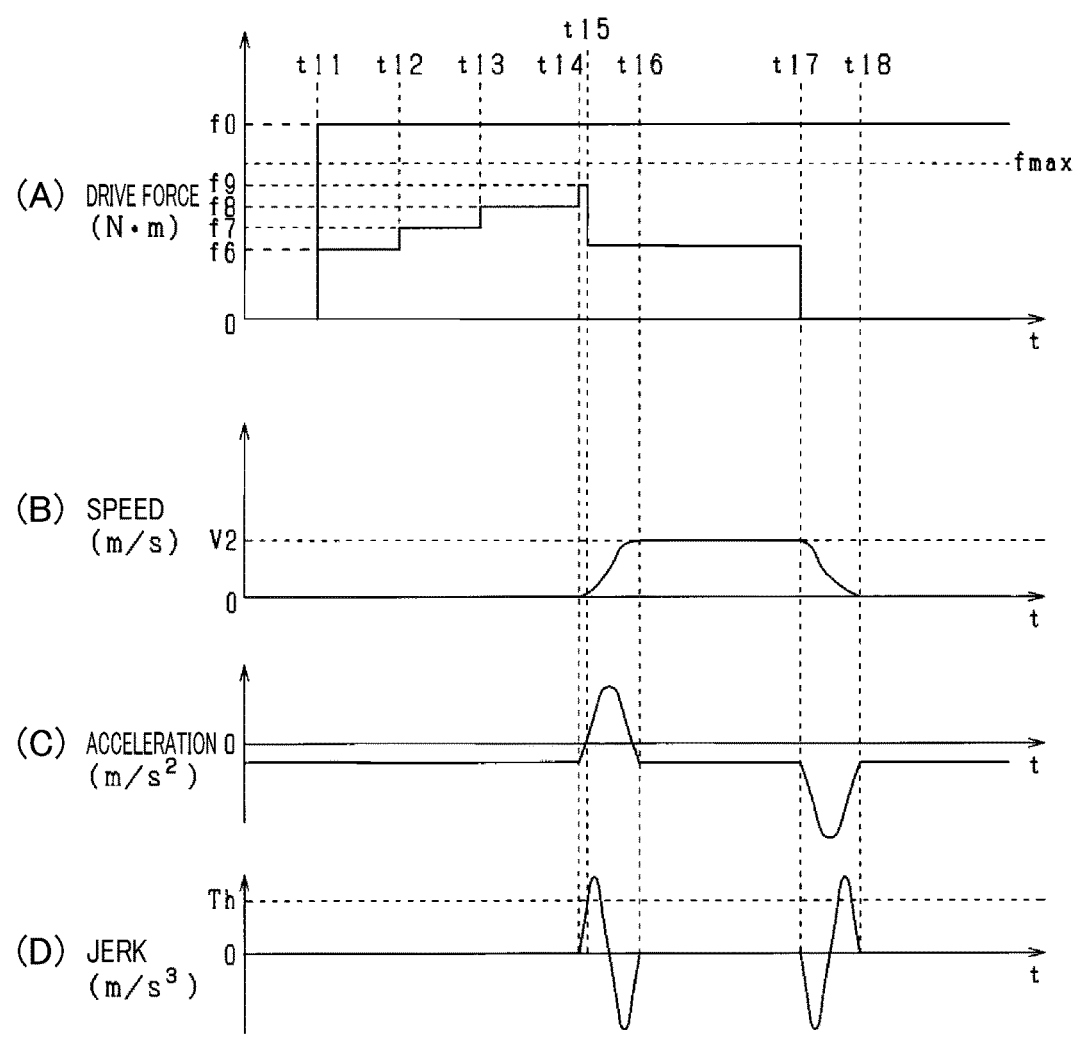
FIG. 6A is one of a set of timing diagrams illustrating the case in which the vehicle on an inclined road surface approaches a wall.
FIG. 6B is one of a set of timing diagrams illustrating the case in which the vehicle on an inclined road surface approaches a wall.
FIG. 6C is one of a set of timing diagrams illustrating the case in which the vehicle on an inclined road surface approaches a wall.
FIG. 6D is one of a set of timing diagrams illustrating the case in which the vehicle on an inclined road surface approaches a wall.

Referring to FIGS. 5A to 5B, the following description sets forth a situation in which the vehicle 30 is set in motion from the state of being halted on an inclined road surface 60, brought close to a wall 50, and parked.

As shown in FIG. 5A, when the vehicle 30 is halted on the inclined road surface 60, with the distance L between the vehicle 30 and the wall 50 being shorter than the driving restraint distance, and when the vehicle 30 is set in motion, the drive force for setting the vehicle in motion will be restrained. In this case, if the restrained drive force is not sufficient as a drive force required for setting the vehicle 30 in motion, the vehicle 30 will not start to move even if the driver depresses the accelerator pedal. If the drive force is then increased, the vehicle 30 starts to move, and the distance L between the vehicle 30 and the wall 50 decreases. Then, as shown in FIG. 5B, when the distance L between the vehicle 30 and the wall 50 becomes shorter than the stopping distance, the drive force is again restrained, and braking control is applied to stop the vehicle 30.

With the vehicle control described referring to FIGS. 5A to 5B, the processing executed by the sensor ECU 10 is equivalent to that shown in the flow diagram of FIG. 3. Therefore, description of that processing is omitted.

FIGS. 6A to 6D are a set of timing diagrams showing the case in which the vehicle control apparatus according to the present embodiment executes the above processing, when the vehicle 30 on the inclined road surface 60 approaches the wall 50.

Initially, the driver is not depressing the accelerator pedal. Hence, the drive force of the vehicle 30 is zero. Let us assume that, subsequently, at time t11, the driver depresses the accelerator, and a requested drive force f0 is applied. However, in this case, the distance L between the vehicle 30 and the wall 50 is shorter than the driving restraint distance, and the drive force is restrained to the restrained drive force f6. The restrained drive force f6 is determined, for example, based on the acceleration detected by the acceleration sensor 16, and corresponds to a drive force for the vehicle to attain a speed V2 on the inclined road surface 60. The restrained drive force f6 may be equal to the restrained drive force f1. The vehicle speed V2 on the inclined road surface 60 may be equal to V1.

In this case, the restrained drive force f6 is not sufficient as a drive force required for setting the vehicle 30 in motion. With the vehicle control apparatus of the present disclosure, the drive force is corrected when this state is maintained for a predetermined duration. Accordingly, at time t12 after lapse of the predetermined time from time t11, the drive force is increased from the restrained drive force f6 to the corrected drive force f7. In this case, if the corrected drive force f7 is not sufficient as a drive force required for setting the vehicle 30 in motion, the vehicle speed, the acceleration, and the jerk remain unchanged. With the vehicle control apparatus of the present disclosure, when this state has continued for a predetermined interval, i.e. at time t13 after lapse of a predetermined time from time t12, the drive force is increased to f8 which is greater than f7. Thereafter, with the vehicle control apparatus of the present disclosure, if the vehicle 30 cannot be set in motion and the jerk does not change, even with the corrected drive force f8 applied, then at time t14, the drive force is increased to f9 which is greater than f8.

Accordingly, with the vehicle control apparatus of the present disclosure, the drive force f9 becomes sufficient, at time t14, as a drive force required for setting the vehicle 30 in motion, and hence the vehicle 30 starts moving. In this case, there is a change in the acceleration in the travel direction, detected by the acceleration sensor 16. Accordingly, the jerk calculated at this time also changes. With the vehicle control apparatus of the present disclosure, when the jerk exceeds the threshold Th at time t15, it is determined that the vehicle 30 has started moving due to the increase in the drive force. If the drive force is maintained in the increased state in this case, there is a risk that the speed for the vehicle 30 to approach the wall 50 is excessive. To address this concern, the vehicle control apparatus of the present disclosure reduces the drive force on condition that the jerk exceeds the threshold Th. For example, the drive force is restored to the restrained drive force f6 from f9. In this case, with the drive force being the restrained drive force f6, if the vehicle 30 has already been set in motion, the vehicle will accelerate based on the restrained drive force f6, and at time t16, will reach the vehicle speed V2 corresponding to the restrained drive force f6. Thereafter, at time t17, when the distance L between the vehicle 30 and the wall 50 becomes shorter than the stopping distance, the vehicle control apparatus of the present disclosure sets the drive force to zero by collision avoidance control, and commences braking control by applying the brakes. The vehicle 30 decelerates under this braking control, and the vehicle speed becomes zero at time t18.

The vehicle control apparatus of the present disclosure having the above configuration provides the following advantageous effects.

When the vehicle 30 detects an object that is an obstacle (e.g., wall 50) which is in the travel direction of the vehicle, the drive force is set to a restrained drive force f1, f6 according to the distance to the object. In this case, if there is a step 61 or the like on the road surface 60 between the vehicle 30 and the object, the drive force of the vehicle 30 is restrained and thus the vehicle 30 will be unable to cross over the step 61. Similarly, if the road surface 60 is inclined, the drive force of the vehicle 30 is restrained and thus the vehicle 30 is unlikely to be set in motion.

In this case, the speed of the vehicle 30 in the travel direction is detected by the wheel speed sensor 13, and a decision is made based on the detected speed as to whether the vehicle has become halted due to the step 61 or due to the inclination of the road surface 60. However, if the vehicle 30 is started to move such as by the driver's accelerator operation, there is a discrepancy between the command for the vehicle 30 to move and the behavior of the vehicle. Hence, in such a case, the drive force of the vehicle 30 is required to be controlled so as to be increased for the movement of the vehicle 30.

If the vehicle 30 is moved as a result of this control, it is necessary then to restore the increased drive force to the restrained drive force f1, f6. However, if the speed of the vehicle 30 is extremely low, the speed detection accuracy of the wheel speed sensor 13 will be low. Thus, there would be a delay in applying control for restoring the increased drive force to the restrained drive force f1, f6 (i.e., delay in control for reducing the drive force) if the control is based on the detected value of the wheel speed sensor 13. In the vehicle 30, the acceleration sensor 16 may be used for detecting acceleration in the travel direction of the vehicle 30 to use the detected acceleration as a basis for determining whether the vehicle has started to move. However, when the road surface 60 is inclined, for example, the acceleration detected by the acceleration sensor 16 is affected by gravitational acceleration, producing an offset in the detected value. Hence, it is difficult to accurately detect start of movement of the vehicle 30, based the acceleration of the vehicle.

In this regard, with the vehicle control apparatus of the present disclosure, the start of movement of the vehicle 30 is detected by using jerk, which is the rate of change in acceleration per unit of time. Accordingly, the vehicle control apparatus of the present disclosure is not affected by the offset caused by gravitational acceleration. In this way, the vehicle control apparatus of the present disclosure can accurately detect the start of movement of the vehicle 30.

With the vehicle control apparatus of the present embodiment, the drive force of the vehicle 30 is increased gradually. Thus, the vehicle control apparatus of the present embodiment can make the drive force minimum for setting the vehicle 30 in motion when the vehicle 30 begins to move, thereby preventing abrupt starting of the vehicle.

With the vehicle control apparatus of the present disclosure, on condition that the jerk of the vehicle 30 has exceeded the threshold Th, the drive force is restored to the restrained drive force f1, f6 (i.e., the increased drive force is decreased). Thus, with the vehicle control apparatus of the present disclosure, the speed of the vehicle 30 after start of movement does not become excessive, thereby preventing the vehicle 30 from contacting an obstacle, such as the wall 50.

When the vehicle 30, which has halted short of crossing over a step 61, starts moving and rides over the step 61, causing change in the jerk of the vehicle 30, it is preferable to temporarily increase the restrained drive force f1 at least until the vehicle 30 completes riding over the step 61. In that respect, with the vehicle control apparatus of the present embodiment, the temporarily increased drive force is ensured to be decreased when the jerk becomes equal to or greater than the threshold Th, and a predetermined time has elapsed from then. Hence, with the vehicle control apparatus of the present embodiment, the vehicle 30 can appropriately ride over the step 61.

<Modifications>

With the above embodiment, the drive force is immediately set to the restrained drive force f1, f6 when the jerk of the vehicle 30 has exceeded the threshold Th. Instead, the drive force may be gradually restrained when the jerk has exceeded the threshold Th.

The threshold Th of jerk of the above embodiment may be variably set based on the post-increase drive force. Specifically, as the drive force increases, the acceleration of the vehicle 30 at the time of starting movement will increase, and the jerk will increase accordingly. Hence, with the present modification, the threshold Th may be set to a larger value as the drive force increases.

With the above embodiment, the time intervals of increasing drive force of the vehicle 30 are equal. However, it would be equally possible to make these time intervals unequal.

With the above embodiment, when increasing the drive force of the vehicle 30, the drive force is incremented equally. However, it would be equally possible to unequally increment the drive force. In particular, the vehicle 30 is highly likely to start to move when the drive force approaches fmax that is a maximum drive force. Hence, with the present modification, the increment of the drive force of the vehicle 30 may be reduced, as the drive force approaches the maximum drive force fmax.

The above embodiment describes control for setting the vehicle 30 in motion from a halted state. However, it would be equally possible to apply similar control when accelerating the vehicle 30 from a state of extremely low speed.

When the vehicle 30, which has been halted short of crossing over a step 61 or the like, is started to move, the step 61 will be crossed over slowly. Thus, the change in acceleration is considered to be gentle, and the jerk is considered not to be large. However, in such a case, vehicle speed on some level is produced due to the starting movement. Hence, when the drive force of the vehicle 30 has been temporarily increased from the restrained drive force f1, the drive force is restored to the original drive force, upon satisfaction of a requirement that the jerk of the vehicle 30 is equal to or greater than a predetermined value, or that the speed of the vehicle 30 is equal to or greater than a predetermined value.

The above embodiment describes that whether the vehicle is in the movement-restrained state is determined based on whether all the conditions (a) to (d) have been satisfied; however, the present invention is not limited to this. With the present modification, for example, the vehicle may be determined to be in the movement-restrained state if at least the conditions (a) and (b) are satisfied.

With the above embodiment, determination as to whether the vehicle is in the movement-restrained state is made based on the detection signal derived from the accelerator sensor 14; however, the present invention is not limited to this. The present modification is applied, for example, to a vehicle 30 automatically operated according to commands from various ECUs 10 to 12. More specifically, when the drive force, which is based on the commands from the ECUs 10 to 12, is restrained due to the distance L between the vehicle 30 and the wall 50, and the vehicle 30 is in the movement-restrained state, control may be applied for increasing the drive force. In this case, the ECUs 10 to 12 serve as command means.

With the above embodiment, the jerk is calculated by differentiating the acceleration detected by the acceleration sensor 16 with respect to time; however, it would be equally possible to use a jerk sensor which directly detects jerk.

The above embodiment has been described by way of an example of using torque as a drive force of the vehicle 30. However, it would be equally possible to control output. With the present modification, for example, the engine speed may be controlled.

With the above embodiment, the drive source of the vehicle 30 is described as being an engine. However, it would be equally possible for the vehicle 30 to be driven by an electric motor, and to control the drive force of the electric motor.

REFERENCE SIGNS LIST

10 . . . Sensor ECU,
11 . . . Engine ECU,
12 . . . Brake ECU,
13 . . . Wheel speed sensor,
14 . . . Accelerator sensor,
15 . . . Brake sensor,
16 . . . Acceleration sensor,
20 . . . Range-finding sensor,
30 . . . Vehicle

The invention claimed is:

1. A vehicle control apparatus comprising:
an object detecting means, using at least one processor, to detect an object in a travel direction of a vehicle;
a restraining means, using the at least one processor, to restrain a drive force of the vehicle when the object detecting means detects the object; and
a jerk acquiring means, using the at least one processor, to acquire a jerk in a travel direction, on the basis of a behavior of the vehicle, wherein
when an accelerator of the vehicle is actuated while the vehicle is in a state in which the drive force of the vehicle is restrained, and a speed of the vehicle is lower than a predetermined value, the restraining means increases the drive force and decreases a post-increase drive force on the basis of the jerk acquired by the jerk acquiring means.

2. The vehicle control apparatus according to claim 1, wherein, when the jerk becomes equal to or greater than a threshold, the restraining means decreases the post-increase drive force, and then when the drive force of the vehicle is increased while the drive force of the vehicle is restrained, the restraining means variably increments the drive force to set the threshold in conformity with each increment of the drive force.

3. The vehicle control apparatus according to claim 1, wherein the restraining means decreases the post-increase drive force when a predetermined time has elapsed from a time point at which the jerk has become equal to or greater than a threshold.

4. The vehicle control apparatus according to claim 1, comprising an acceleration acquiring means acquiring an acceleration in a travel direction of the vehicle, wherein
the jerk acquiring means acquires the jerk on the basis of the acceleration acquired by the acceleration acquiring means.

5. A vehicle control method for a vehicle control apparatus, the vehicle control apparatus utilizing at least one processor, the method comprising:
an object detecting step of detecting an object in a travel direction of a vehicle;
a restraining step of restraining a drive force of the vehicle when the object is detected in the object detecting step; and
a jerk acquiring step of acquiring a jerk value in the travel direction, the jerk being detected based on a behavior of the vehicle, wherein the jerk detecting step is performed using the at least one processor, wherein
in the restraining step, when an accelerator of the vehicle is actuated while the vehicle is in a state in which the drive force of the vehicle is restrained, and a speed of the vehicle is lower than a predetermined value, the drive force of the vehicle is increased, and a post-increase drive force is decreased on the basis of the jerk value acquired in the jerk acquiring step.

6. A vehicle control apparatus comprising:
a memory;
a processor communicable to the memory; and
a set of computer-executable instructions stored on the memory that cause the processor to implement:

detecting an object in a travel direction of a vehicle;
restraining a drive force of the vehicle when the object is detected; and
acquiring a jerk in a travel direction, on the basis of a behavior of the vehicle, wherein
when an accelerator of the vehicle is actuated while the vehicle is in a state in which the drive force of the vehicle is restrained, and a speed of the vehicle is lower than a predetermined value, the processor increases the drive force and decreases a post-increase drive force on the basis of the jerk acquired.

* * * * *